United States Patent
Nam et al.

(10) Patent No.: US 10,445,014 B2
(45) Date of Patent: Oct. 15, 2019

(54) METHODS OF OPERATING A COMPUTING SYSTEM INCLUDING A HOST PROCESSING DATA OF FIRST SIZE AND A STORAGE DEVICE PROCESSING DATA OF SECOND SIZE AND INCLUDING A MEMORY CONTROLLER AND A NON-VOLATILE MEMORY

(71) Applicant: SAMSUNG ELECTRONICS CO., LTD., Suwon-si, Gyeonggi-do (KR)

(72) Inventors: Hee Hyun Nam, Seoul (KR); Young Sik Kim, Suwon-si (KR); Jin Woo Kim, Seoul (KR); Young Jo Park, Yongin-si (KR); Jae Geun Park, Suwon-si (KR); Young Jin Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 73 days.

(21) Appl. No.: 15/676,651

(22) Filed: Aug. 14, 2017

(65) Prior Publication Data

US 2018/0081584 A1 Mar. 22, 2018

(30) Foreign Application Priority Data

Sep. 20, 2016 (KR) .................. 10-2016-0119990

(51) Int. Cl.
*G06F 3/06* (2006.01)
(52) U.S. Cl.
CPC .......... *G06F 3/0644* (2013.01); *G06F 3/0613* (2013.01); *G06F 3/0616* (2013.01);
(Continued)

(58) Field of Classification Search
CPC .... G06F 3/0644; G06F 3/0616; G06F 3/0679; G06F 3/0613; G06F 3/0647; G06F 3/0656
(Continued)

(56) References Cited

U.S. PATENT DOCUMENTS 6,128,707 A * 10/2000 Arimilli .............. G06F 12/0804
710/35
7,739,443 B2 6/2010 Aizawa
(Continued)

FOREIGN PATENT DOCUMENTS

JP 2000181784 A 6/2000
KR 1020110103142 A 9/2011
(Continued)

OTHER PUBLICATIONS

The Cache Moemory Boo, second edition, Jim Handy, Academic Press, 1993, entire pages.*

*Primary Examiner* — Hong C Kim
(74) *Attorney, Agent, or Firm* — Volentine, Whitt & Francos, PLLC

(57) ABSTRACT

A method of operating a memory controller is provided. The method of operating a memory controller according to an exemplary embodiment of the present inventive concepts includes sequentially receiving, by the memory controller, first data segments each having a first size from a host, sequentially storing, by the memory controller, the first data segments in the buffer until a sum of sizes of changed data among data stored in a buffer included in the memory controller is a second size, and programming, by the memory controller, the changed data having the second size in a memory space of a non-volatile memory as a second data segment.

15 Claims, 6 Drawing Sheets

(52) U.S. Cl.
CPC .......... *G06F 3/0647* (2013.01); *G06F 3/0656* (2013.01); *G06F 3/0679* (2013.01)

(58) Field of Classification Search
USPC .................. 711/118, 103, 4; 710/36, 52
See application file for complete search history.

(56) References Cited

U.S. PATENT DOCUMENTS

| | | |
|---|---|---|
| 8,307,149 B2 | 11/2012 | Honda et al. |
| 8,364,884 B2 | 1/2013 | Nagadomi |
| 8,688,895 B2 | 4/2014 | Ahn et al. |
| 8,850,291 B2 | 9/2014 | Kang et al. |
| 8,898,420 B2 | 11/2014 | So et al. |
| 8,909,854 B2 | 12/2014 | Yamagishi et al. |
| 9,164,704 B2 | 10/2015 | Marukame et al. |
| 2002/0013874 A1* | 1/2002 | Gelke ............... G06F 13/4018 710/305 |
| 2006/0064538 A1* | 3/2006 | Aizawa ............. G06F 13/1678 711/103 |
| 2006/0136656 A1* | 6/2006 | Conley .............. G06F 12/0246 711/103 |
| 2008/0250202 A1* | 10/2008 | Conley .............. G06F 12/0862 711/115 |
| 2011/0197013 A1* | 8/2011 | Hirano ............... G06F 12/0851 711/3 |
| 2012/0246392 A1* | 9/2012 | Cheon ................ G06F 12/0871 711/103 |
| 2013/0191609 A1* | 7/2013 | Kunimatsu ............ G06F 12/10 711/203 |
| 2015/0193354 A1* | 7/2015 | Kwon ................ G06F 12/1027 711/207 |

FOREIGN PATENT DOCUMENTS

| | | |
|---|---|---|
| KR | 20150080838 A | 7/2015 |
| KR | 20160144574 A | 12/2016 |

* cited by examiner

METHODS OF OPERATING A COMPUTING SYSTEM INCLUDING A HOST PROCESSING DATA OF FIRST SIZE AND A STORAGE DEVICE PROCESSING DATA OF SECOND SIZE AND INCLUDING A MEMORY CONTROLLER AND A NON-VOLATILE MEMORY

CROSS-REFERENCE TO RELATED APPLICATIONS

This application claims priority under 35 U.S.C. § 119 from Korean Patent Application No. 10-2016-0119990 filed on Sep. 20, 2016, the disclosure of which is hereby incorporated by reference in its entirety.

BACKGROUND

Embodiments of the inventive concept relate to methods of operating a memory controller, and more particularly to a method of programming (or writing) data in a non-volatile memory using a memory address mapping between a storage device buffer and the non-volatile memory.

A memory generally includes a volatile memory and a non-volatile memory. While data stored in the volatile memory is lost when the supply of an external voltage stops, the non-volatile memory has an advantage of keeping data stored in the non-volatile memory even if the supply of an external voltage stops.

In a computing system, data needs to be processed at a high speed is processed using the volatile memory, but when it is necessary to keep data, the data is stored in the non-volatile memory.

A unit for processing data in a host is different from a unit for storing data in a non-volatile memory, and thus, when data with a smaller size than data to be processed in the non-volatile memory device is stored in the non-volatile memory, a plurality of writing requests occur more frequently than necessary in the host. As a result, there is a burden of processing a number of instructions using a processor of the host, and the non-volatile memory may have a problem of lifetime shortening due to wear-out.

SUMMARY

In one embodiment, the inventive concept provides a method of operating a memory controller in a storage device, wherein the memory controller comprises a memory processor and a buffer. The method includes; sequentially receiving first data segments from a host under the control of the memory processor, wherein each first date segment has a first size, sequentially storing the received first data segments in the buffer until a cumulative size of the received first data segments reaches a second size, and programming a second data segment having the second size and including the stored first data segments in a non-volatile memory.

In another embodiment, the inventive concept provides a method of operating a computing system including a host and a storage device including a memory controller including a buffer, and a non-volatile memory. The method includes; sequentially transmitting first data segments from the host to the storage device, wherein each first data segment has a first size, and sequentially and temporarily storing the first data segments in the buffer until a cumulative size of the stored first data segments equals or exceeds a second size, wherein the first size corresponds to a processing unit for data received by the storage device from the host or data temporarily stored by the host before transmitting of the first data segments to the storage device, and the second size is a processing unit for data processed by the memory controller, or data programmed in the non-volatile memory.

In still another embodiment, the inventive concept provides a method of operating a computing system including a host and a storage device including a memory controller including a buffer, and a non-volatile memory (NVM). The method includes; generating program data in the host to be programmed to the NVM, if the program data has a size at least equal to a second size, performing a data block output operation using a device driver provided by the host to transmit a data block of the program data to the storage device, and thereafter programming the data block in the NVM, if the program data has a size less than the second size, sequentially transmitting first data segments from the host to the storage device, wherein each first data segment has a first size less than the second size, and sequentially and temporarily storing the first data segments in the buffer until a cumulative size of the stored first data segments equals or exceeds the second size, wherein the first size corresponds to a processing unit for data received by the storage device from the host or data temporarily stored by the host before transmitting of the first data segments to the storage device, and the second size is a processing unit for data programmed in the non-volatile memory.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Reference now will be made in some additional detail to the embodiments of the inventive concept, such as those specifically illustrated in the accompanying drawings, wherein like reference numbers and labels are used to denote like or similar elements.

Figure 1:
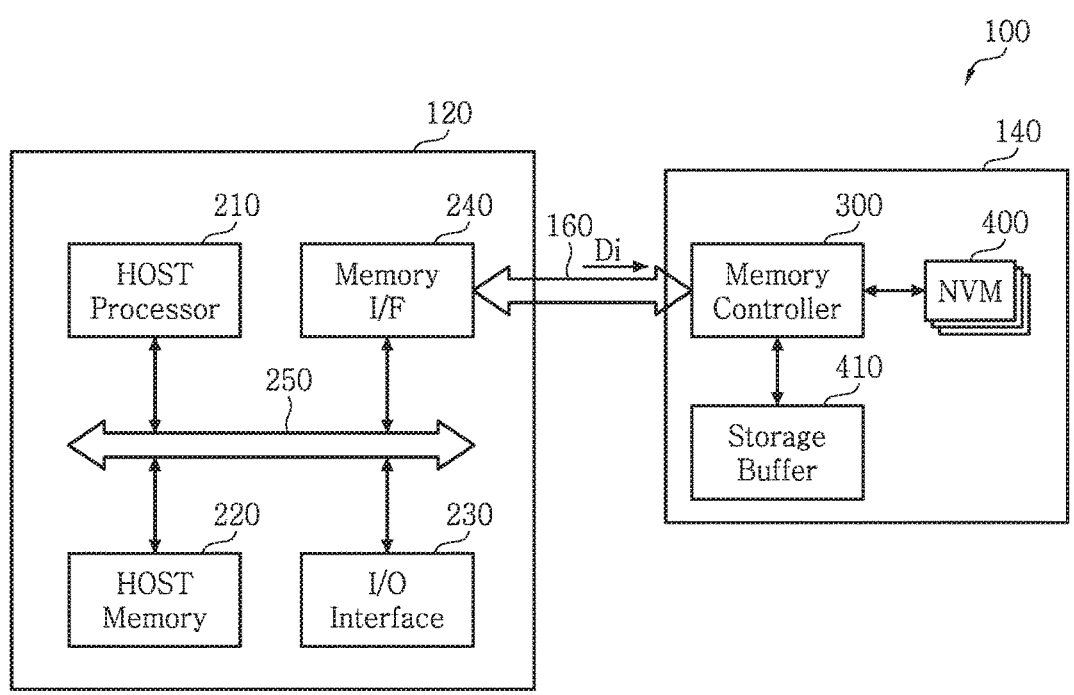
FIG. 1 is a block diagram of a computing system according to embodiments of the inventive concepts.

FIG. 1 is a block diagram of a computing system 100 according to an exemplary embodiment of the inventive concept. Referring to FIG. 1, the computing system 100 may generally include a host 120 and a storage device 140 connected via a storage bus 160. The computing system 100 may be a server-client system, a Personal Computer (PC), or a mobile computing device, such as a mobile phone, a tablet PC, an Internet of Things (IoT) device, or an Internet of Everything (IoE) device.

The host 120 illustrated in FIG. 1 includes a host processor 210, a host memory 220, an input/output (I/O) interface 230, and a memory interface 240 interconnected via a host bus 250.

In certain embodiments of the inventive concept, the host 120 may operate according to a memory mapped input/output (I/O) method. For example, the memory mapped I/O method(s) assumed as illustrative example(s) hereafter may manipulate (e.g., write to, read from, designate, allocate, deallocate, assign, configure and/or arrange memory space) address space associated with the constituent I/O interface 230 and/or address space of the host memory 220 as a single memory space without regard to physical provision or separation. Therefore, the host 120 may recognize memory resource(s), possibly including one or more memory register(s), associated with the I/O interface 230 as an integral part of an entire memory, and may therefore allocate/deallocate an address corresponding to certain data within the entire memory address space.

Here, the term "entire memory" may refer to accessible memory resources included in the host 120, but specifically excluding memory resources included in the storage device 140. The term "entire memory address space" may refer to the address space corresponding to the entire memory, and specifically includes at least address space used to access the host memory 220 and address space used to access the I/O interface 230.

As noted above, the host 120 is connected to the storage device 140 via the storage bus 160, where the storage bus 160 may be a peripheral component interconnect (PCI) bus, for example.

The host processor 210 may generally control the operation of the host 120. For example, the host processor 210 may control the operation of and/or the interoperation between the host memory 220, I/O interface 230, memory interface 240, and/or host bus 250.

The host processor 210 may program first data segments (e.g., "Di", where 'i' is a natural number) to a non-volatile memory (NVM) 400 using a memory controller 300. In this context, a "data segment" may refer to a set of data bits.

The host processor 210 may sequentially transmit each of the first data segments Di to the storage device 140. Each of the first data segments Di is assumed to have a first size. Here, the term "first size" may refer to a basic (or minimum) unit size for data processed (e.g., temporarily stored) in response to a host instruction (e.g., a "processing unit" size for the host in relation to at least one of transmitting a data segment to the data storage 140, and internally processing within the host). For example, the host 120 may temporarily store data having the first size in response to the processing of a host instruction somewhere in the entire memory and/or an external memory, such as NVM 400. In certain embodiments of the inventive concept, the first size may be 64 bytes, but those skilled in the art will recognize that any reasonable definition of the first size may be used in embodiments. of the inventive concept.

With this understanding of the term first size in mind, the host processor 210 may determine whether to program data having a "second size", different from (i.e., greater than) the first size, in an external memory resource, such as the NVM 400. Alternately or additionally, the host processor 210 may determine whether to program each of the first data segments Di in the NVM 400 using a device driver included in the host 120. In certain embodiments of the inventive concept, the second size refers to a basic (or minimum) unit associated with data processing by a storage device memory processor or with the programming of data in the NVM 400. The second size may be, for example, 512 bytes or 4 kilo bytes. That is, the second size may be differently defined according to the data processing and/or data storage requirements of the computing system.

In this regard, the host processor 210 may transmit one or more of the first data segments Di having the first size to the storage device 140, thereby decreasing the demand placed upon the storage bus 160, as conventionally required to program a data block of second size to the NVM 400. That is, the host processor 210 according to certain embodiments of the inventive concept may transmit one or more of the first data segments Di to the storage device 140 via the memory interface 240.

In this manner, the host processor 210 may transmit first data segment(s) Di without necessarily using a device driver conventionally controlling data transmission(s) between the host 120 and storage device 140. That is, the host processor 210 may allocate a portion of the entire memory address space (i.e., memory address space accessible by the host processor 210) in relation to a buffer (e.g., buffer 340 shown in FIG. 2) accessible by the memory controller 300. For example, one or more of the first data segments Di and may temporarily stored in a buffer associated with the memory controller 300 using an allocated portion of the entire memory address space.

Returning to FIG. 1, the host memory 220 may store data necessary to the operation of the host 120, such as the temporary storing of data required to process a host instruction. For example, the host memory 220 may receive data having the first size under the control of the host processor 210.

The I/O interface 230 may be used to control the operation of various I/O device (e.g., a keyboard, a mouse, and/or a display device) in response to various I/O requests made by the host processor 210.

The memory interface 240 may be used to change (or convert) the format of the first data segments Di transmitted to the memory controller 300, such that the format of the first data segments Di will be recognized and may be processed by the memory controller 300. In this regard, the memory interface 240 may convert the format of the first data segments Di before such are provided to the memory controller 300 via the storage bus 160. In addition, the memory interface 240 may receive data transmitted from the memory controller 300 and change its format, as needed. Accordingly, certain embodiments of the inventive concept may include the memory interface 240 having an integral transceiver for transmitting and receiving data.

The memory interface 240 may be embodied as providing one or more data interfaces, such as a SATA interface, a SATAe interface, a SAS interface, and a PCIe interface, for example.

The host bus 250 may, for example, be embodied in an advanced microcontroller bus architecture (AMBA), an advanced high-performance bus (AHB), an advanced peripheral bus (APB), an advanced extensible interface (AXI), an advanced system bus (ASB), or a combination thereof.

As described above, the storage device 140 may be configured to receive and store the first data segments Di transmitted by the host 120. The storage device 140 may store data accordingly to a buffer address-to-NVM memory address mapping table (hereafter, "buffer-to-NVM mapping table") in which buffer address(es) associated with the buffer 340 included in the memory controller 300 are respectively mapped in a one-to-one relationship with memory address (es) associated with the NVM 400.

The storage device 140 may receive the buffer-to-NVM mapping table from the host 120 during an initialization operation. Moreover, as the buffer-to-NVM mapping table requires update, the storage device 140 may receive such updates from the host 120. In certain embodiments of the inventive concept, upon connection of the storage device 140 to the host 120, a computing system initialization, or a storage device initialization procedure may include transmitting of certain initialization information from the storage device 140 to the host 120, wherein the initialization information includes a last known and valid state of the buffer-to-NVM mapping table. Thereafter, in response to host instructions, the buffer-to-NVM mapping table may be updated in at least one of the host 120 and the storage device 140.

The storage device 140 may be variously embodied, for example, as a solid state drive (SSD), a universal flash storage (UFS), a multimedia card (MMC), an embedded MMC (eMMC), or a perfect page new (PPN) NAND.

As illustrated in FIG. 1, the storage device 140 includes the memory controller 300, NVM 400, as well as a storage buffer 410. The memory controller 300 may be used to generally control the operation of the storage device 140. The memory controller 300 may read data from the NVM 400 and transmit the resulting read data to the host 120 via the storage bus 160. Alternately or additionally, the memory controller 300 may program data received from the host 120 in the NVM 400 via the storage buffer 410.

The memory controller 300 may temporarily and incrementally store the first data segments Di as received from the host 120 in a buffer (e.g., buffer 340 shown in FIG. 2) included in the memory controller 300. Once the total (or cumulative) size of the received data (e.g., a sequence of first data segments Di) temporarily stored in the buffer 340 reaches the second size, the cumulatively stored data in the buffer 340 may be programmed to the NVM 400 under the control of the memory controller 300.

In the foregoing configuration, the storage device 140 may ascertain an address mapping relationship between a particular buffer address and a corresponding NVM memory address with reference to the buffer-to-NVM address mapping table. Accordingly, the host 120 may transmit data to a buffer address having a one-to-one corresponding relationship to a NVM memory address in order to program the data in a specific memory address in the NVM 400.

The NVM 400 may be variously configured to store data received from the host 120. For example, the NVM 400 may include a plurality of NAND flash memories. The NVM 400 may be configured as a three-dimensional (3D) memory cell array that is monolithically formed in one or more physical levels of arrays of memory cells having an active area disposed above a silicon substrate and circuitry associated with the operation of those memory cells, whether such associated circuitry is above or within such substrate. Here, the term "monolithic" means that layers of each level of the array are directly deposited on the layers of each underlying level of the array.

In certain embodiments of the inventive concept, the 3D memory cell array includes vertical NAND strings that are vertically oriented such that at least one memory cell is located over another memory cell. The at least one memory cell may comprise a charge trap layer.

The storage buffer 410 may be used as a cache (or cache buffer) for the storage device to temporarily store received data to later be stored in the NVM 400, or data read from the NVM 400. The storage buffer 410 may be implemented using a volatile memory, such as a static random access memory (SRAM) or a dynamic random access memory (DRAM).

For convenience in the detailed description that follows, it is assumed that the storage buffer 410 is provided external to (or separate from) the memory controller 300. However, this need not be the case in certain embodiments of the inventive concept. That is, the storage buffer 410 may be provided internal to the memory controller 300.

Figure 2:
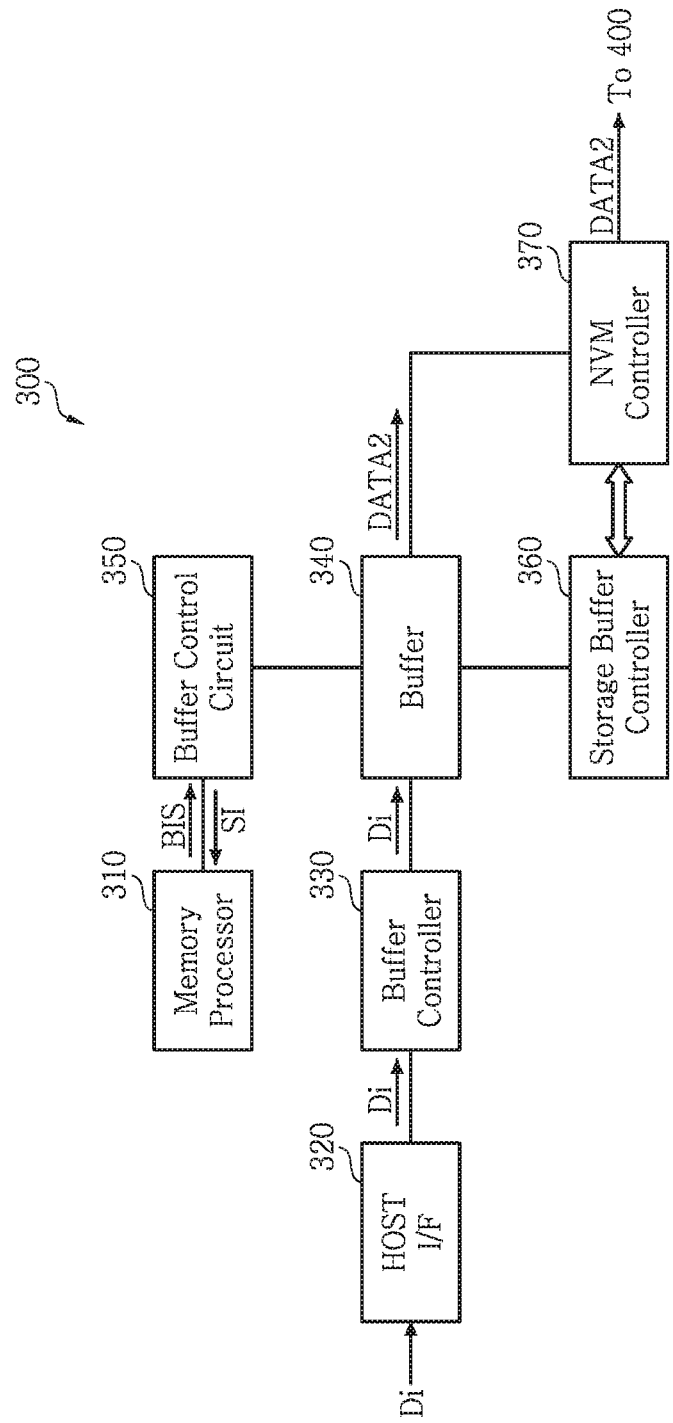
FIG. 2 is a block diagram further illustrating in one example the memory controller shown in FIG. 1.

FIG. 2 is a block diagram further illustrating in one example the memory controller 300 of FIG. 1. Referring collectively to FIGS. 1 and 2, the memory controller 300 may include a memory processor 310, a host interface 320, a buffer controller 330, the buffer 340, a buffer control circuit 350, a storage buffer controller 360, and a NVM controller 370.

The memory processor 310 may be used to generally control the operation of the memory controller 300. For example, the memory processor 310 may control the operation of and/or interoperation between the host interface 320, buffer 340, buffer control circuit 350, storage buffer controller 360, and/or NVM controller 370.

The memory processor 310 may receive storage information SI indicating whether to program the first data segments Di received from the host 120 in the NVM 400 from the buffer control circuit 350. For example, the storage information SI may indicate a count value obtained by counting a number of received first data segments Di, or otherwise monitoring a cumulative size of received data stored in the buffer 340. That is, the storage information SI may be information (or data) variously indicating whether to program the cumulatively received first data segments Di in the NVM 400.

In this regard, the memory processor 310 may be used to determine whether to program the cumulatively received first data segments Di that have been temporarily stored in the buffer 340 in the NVM 400 based on the storage information SI. Upon determining to program the cumulatively received first data segments Di, the memory processor 310 may transmit a corresponding buffer indication signal BIS to the buffer control circuit 350. In this manner, the memory processor 310 may cause a second data segment DATA2 to be programmed in the NVM 400 using, for example, the storage buffer controller 360 and the storage buffer 410. Here, the second data segment DATA2 (including at least the cumulatively received first data segments Di) may have the second size.

In other words, the memory processor 310 may program the second data segment DATA2 in the NVM 400 after accumulating (e.g., temporarily storing in an incremental manner) the second data segment DATA2 in the storage buffer 410. Alternately, the second data segment DATA2 may be programmed in the NVM 400 using the NVM controller 370 without storing the second data segment in the storage buffer 410.

The host interface 320 may be used change the format of data to-be-transmitted to the host 120, such that the format of the data may be recognized and used by the host 120. The host interface 320 may then be used to transmit the data having the changed format to the host 120 via the storage bus 160. Additionally, the host interface 320 may receive the first data segments Di transmitted from the host 120, change the format of the received first data segments Di, and temporarily store the first data segments Di having the changed format in the buffer 340. According to an exemplary embodiment, the host interface 320 may include a transceiver for transmitting and receiving data. Thus, host interface 320 may be embodied, for example, as one or more of an SATA interface, SATAe interface, SAS interface, and/or PCIe interface.

The buffer controller 330 may be used to control the operation of the buffer 340 under the overall control of the memory processor 310. The first data segments Di received from the host 120 may be sequentially stored in the buffer 340 under the control of the buffer controller 330.

The buffer 340 may temporarily store the first data segments Di each having the first size. The first data segments Di may be sequentially stored in the buffer 340. One example of the buffer 340 will be described in some additional detail with reference to FIG. 3.

The buffer control circuit 350 may transmit storage information SI indicating whether to program the first data segments Di received from the host 120 in the NVM 400 to the memory processor 310. The buffer control circuit 350 may program the second data segment DATA2 stored in the buffer 340 and having the second size in the NVM 400 according to a buffer indication signal BIS transmitted from the memory processor 310. For example, the second data segment DATA2 may include at least one of the first data segments Di.

While the buffer controller 330 and buffer control circuit 350 are separately shown in FIG. 2 for clarity of description, these elements may be embodied in a single circuit or integrated circuit in various embodiments of the inventive concept.

The storage buffer controller 360 may be used to write data in the storage buffer 410 or read data from the storage buffer 410 under the overall control of the memory processor 310. The data processed by the storage buffer controller 360 may be transmitted to the NVM controller 370 or the host interface 320.

The NVM controller 370 may be used to control the NVM 400 under the overall control of the memory processor 310. The data stored in the NVM 400 may be read or data may be written in the NVM 400 according to a control of the NVM controller 370.

Figure 3:
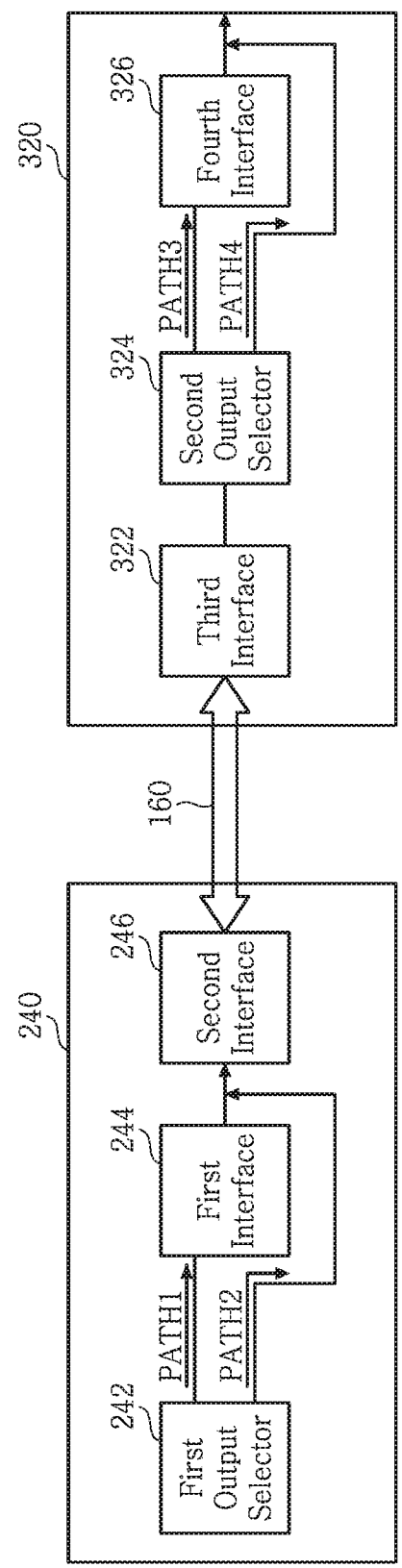
FIG. 3 is a block diagram further illustrating in one example the memory interface and host interface shown in FIGS. 1 and 2.

FIG. 3 is a block diagram further illustrating in one embodiment an operational relationship between the memory interface 240 and host interface 320 of FIGS. 1 and 2. Referring to FIGS. 1, 2 and 3, the memory interface 240 may include a first output selector 242, a first interface 244, and a second interface 246.

The first output selector 242 may be used to select between a first path PATH1 and a second path PATH2. That is, the first output selector 242 may select whether to transmit the first data segments Di via the first interface 244 and the second interface 246, or the second interface 246. Here, the first output selector 242 may operate, for example, under the control of the host processor 210.

When the first output selector 242 selects the first path PATH1, the format of the first data segments Di may be sequentially converted using both of the first interface 244 and second interface 246. Alternately, when the first output selector 242 selects the second path PATH2, the format of the first data segments Di is not changed by the first interface 244, but may be processed by only the second interface 246. Thus, the first interface 244 may convert (or transform) the format of the first data segments Di received from the first output selector 242, such that the resulting format of the first data segments is compatible with the storage device 140. For example, the first interface 244 may be embodied as an NVMe protocol.

The second interface 246 may further process the re-formatted, first data segments Di such that the resulting first data segments Di are compatible with the requirements of the storage bus 160. Accordingly, the second interface 244 may be embodied in a PCIe interface, for example.

As shown in the illustrated example of FIG. 3, the host interface 320 may include a third interface 322, a second output selector 324, and a fourth interface 326.

The third interface 322 may perform an inverse transformation of the transformation performed by the second interface 246 on the first data segments Di received from the host 120. Accordingly, the second interface 246 and the third interface 322 may be the same type of interface.

The second output selector 324 may select one of a third path PATH3 and a fourth path PATH4. That is, the second output selector 324 may select whether to transmit the first data segments Di whose format is transformed by the third interface 322 to the fourth interface 326. The second output selector 326 may operate according to a control of the memory processor 310; however, it is not limited thereto.

An operation of the second output selector 324 may be paired with an operation of the first output selector 242. That is, when the first output selector 242 selects the first path PATH1, the second output selector 324 selects the third path PATH3, and when the first output selector 242 selects the second path PATH2, the second output selector 324 selects the fourth path PATH4.

The fourth interface 326 may perform an inverse transformation of the transformation performed by the first interface 244 on the first data segments Di received from the second output selector 324. Accordingly, the first interface 244 and the fourth interface 326 may be the same type of interface.

The host 120 may transmit the first data segments Di each having the first size to the memory controller 300 through the second path PATH2 and the fourth path PATH4. At this time, the host 120 may transmit the first data segments Di to the memory controller 300 without performing a format transformation using the first interface 244. As a result, the received first data segments Di may be stored in the buffer 340 without performing a format inverse transformation using the fourth interface 326.

The host processor 210 does not perform a format transformation using the first interface 244, and thus the number of instructions to be performed by the host processor 210 can be reduced.

It should be noted at this point that the host may use one or more the various interfaces to provide some form of error detection and/or correction (hereafter, generally referred to as "error detection") to certain approaches to the programming of data to the NVM 400. For example, during a particular data format conversion of definition, one or more error detection bits (e.g., one or more parity bit(s)) may be added to each first data segment. Thereafter, when the second data segment is programmed in the NVM 400 the memory controller 300 may run an error detection procedure to verify the accuracy of respective first data segments included within the second data segment.

Figure 4:
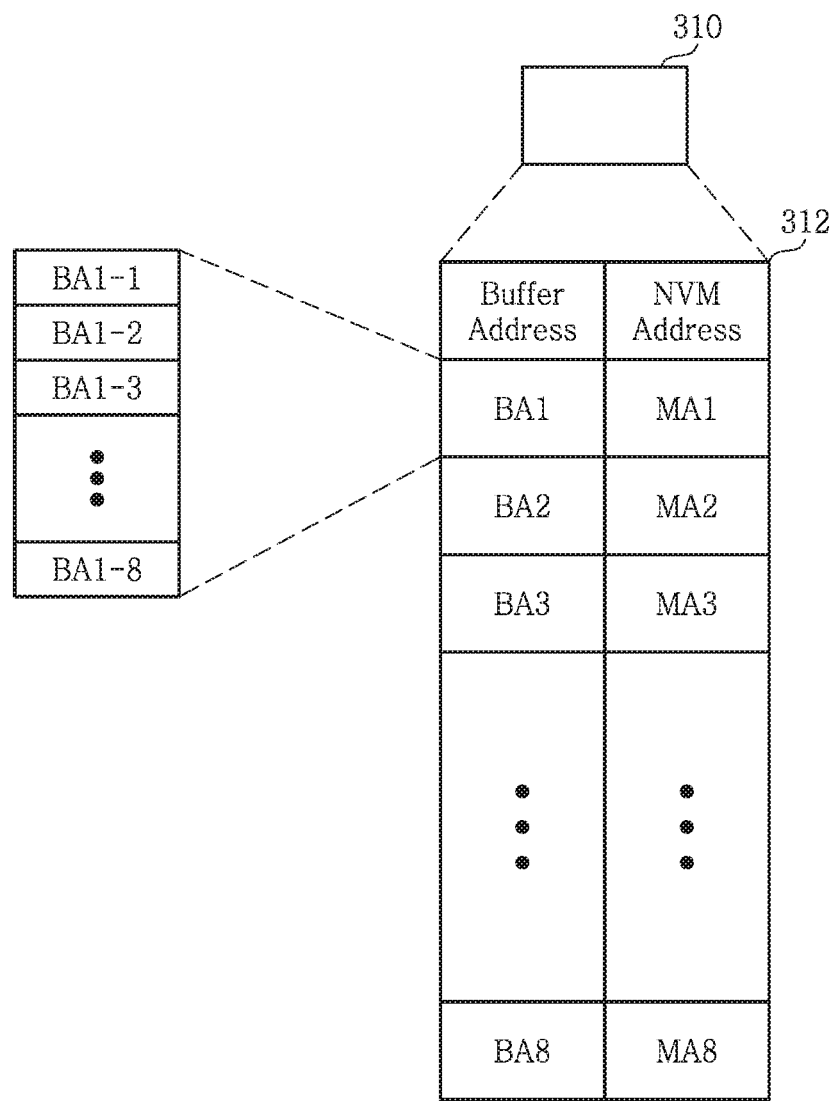
FIG. 4 shows a buffer address-nonvolatile memory address mapping table according to embodiments of the present inventive concepts.

FIG. 4 is a conceptual diagram further illustrating in one example a buffer-to-NVM address mapping table 312 that may be used in certain embodiments of the inventive concept. Referring to FIG. 4, the buffer-to-NVM address mapping table 312 may include a buffer address data structure (hereafter, "buffer address BAn") associated with the buffer 340, e.g., BAn, where 'n' is a natural number ranging (e.g.,) from one to eight, and a memory address data structure (hereafter, "memory address MAn") associated with the NVM 400, e.g., MAn where respective elements in the memory address have a one-to-one corresponding (or mapping) relationship with a buffer address element BAn.

A defined size for each element (e.g., a memory location or space) in the buffer address BAn may be the same as a defined size for each element in the memory address MA. Further, the cumulative size of the full buffer address BAn and/or the cumulative size of the full memory address MAn may be the same as the second size.

For convenience of description, only eight (8) buffer address elements BA1 to BA8 and eight corresponding memory address elements MA1 to MA8 are described, but the inventive concept is not limited to this example. That is, the number of elements (e.g., address locations) contemplated by the buffer-to-NVM address mapping table 312 may be varied according to a the (e.g.,) the size of the buffer 340, the size and/or configuration of the NVM 400, a desired first size, a desired second size, etc.

The buffer-to-NVM address mapping table 312 may be stored in the memory processor 310. When the storage information SI indicates that the first data segments Di will be programmed in the NVM 400, the memory processor 310 may program data (e.g., the second data segment DATA2) in the NVM 400 with reference to the buffer-to-NVM address mapping table 312.

Accordingly, when the second data segment DATA2 having the second size stored in a memory space corresponding to a specific buffer address BAn element (e.g., BA1) is programmed in the NVM 400, the memory processor 310 may program the second data segment DATA2 in a memory space defined by a corresponding memory address MAn element (e.g., MA1) with reference to the buffer-to-NVM address mapping table 312.

Each of a plurality of sub-buffer addresses BA1-1 to BA1-8 may represent an address in memory space in which a first data segment Di may be temporarily stored. Thus, a size of each one of the plurality of sub-buffer addresses BA1-1 to BA1-8 may be the same size as a first data segment Di (e.g., the first size).

For convenience of description in FIG. 4, eight (8) sub-buffer addresses BA1-1 to BA1-8 are shown. However, the inventive concept is not limited thereto. That is, each of the buffer addresses BA1 to BA8 stored in the buffer address-nonvolatile memory address mapping table 312 may include eight sub-buffer addresses, but the sizes and/or number of sub-buffer addresses included in each of the buffer addresses BA1 to BA8 may be variously changed according to the computing system 100.

Figure 5:
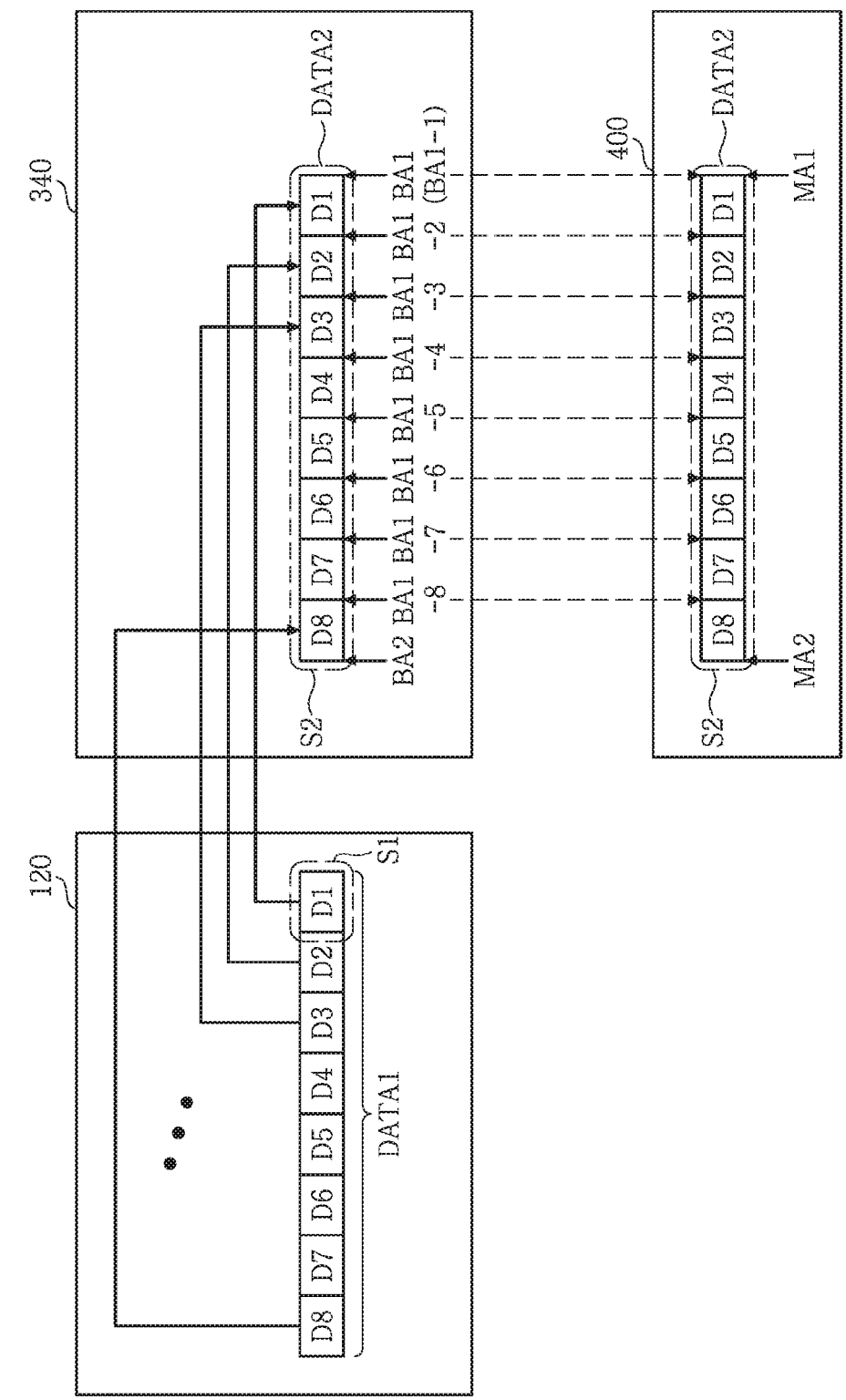
FIG. 5 is a conceptual drawing illustrating a procedure during which first data segments are programmed in a memory space of a non-volatile memory according to exemplary embodiments of the present inventive concepts.

FIG. 5 is a conceptual diagram further illustrating in one example a procedure or an approach, whereby data segments may be programmed in a NVM 400 according to embodiments of the inventive concept. Referring to FIGS. 1, 2, 3, 4 and 5, the host 120 may program data segments (e.g., D1 to D8) each having the first size 51 in the NVM 400. Here, it is assumed that the data segments D1 to D8 are sequentially stored in the buffer 340 included in the storage device 140.

In the context of the illustrated example of FIG. 5, the host 120 may store data segment D1 in a memory space corresponding to a first sub-buffer address BA1-1 of the buffer 340, and then store a data segment D2 in a memory space corresponding to a second sub-buffer address BA1-2 of the buffer 340. The host 120 may store each of data segments D3 to D8 in each memory space corresponding to each of sub-buffer addresses BA1-3 to BA1-8.

When a cumulative size of the data including the data segments D1 to D8 sequentially stored in the buffer 340 equals the second size S2, the memory processor 310 may collectively program the data segments D1 to D8 in the NVM 400, as the second data segment DATA2. That is, the memory processor 310 may determine a location in memory space in which the second data segment DATA2 will be stored among the memory spaces of the NVM 400 with reference to the buffer-to-NVM address mapping table 312 stored in the memory processor 310.

In this context and referring to FIGS. 4 and 5, the first element of the buffer address BA1 is mapped one-to-one onto the first element of the memory address MA1. Thus, the data segments D1 to D8 stored in a memory space of the buffer 340 corresponding to the first element of the buffer address BA1 may be programmed in a memory space of the NVM 400 corresponding to the first element of the memory address MA1.

Memory space associate with an element of the buffer address BAn and memory space associated with an element of the memory address MAn may have the same size (e.g., the second size S2). As a result, the memory processor 310 may readily program the data segments D1 to D8 stored in the memory space corresponding to the buffer address BA1 of the buffer 340 in the memory space corresponding to the memory address MA1 among the memory spaces of the NVM 400 with reference to the buffer-to-NVM address mapping table 312.

Figure 6:
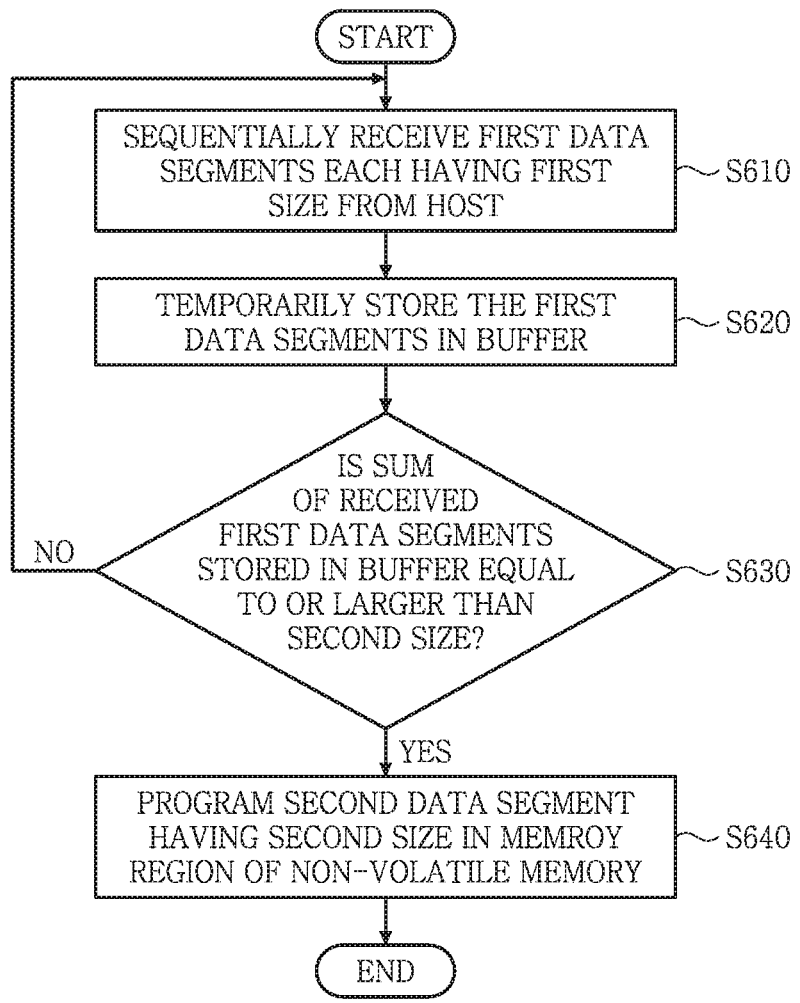
FIG. 6 is a flowchart summarizing a method by which a host programs data in the non-volatile memory according to exemplary embodiments of the present inventive concepts.

FIG. 6 is a flowchart summarizing a method according to which a host may efficiently program data in a non-volatile memory according to embodiments of the inventive concept. Referring to FIGS. 1, 2, 3, 4, 5 and 6, the memory controller 300 is assumed to sequentially receive a set of first data segments D1 to D8 from the host 120 (S610), where each of the first data segments D1 to D8 is further assumed to have the first size 51.

In response, the memory controller 300 may sequentially and temporarily store the received first data segments D1 to D8 in the buffer 340 (S620).

When storage information SI indicates that the first data segments D1 to D8 should be collectively programmed in the NVM 400, the memory controller 300 may program the second data segment DATA2 having the second size S2 in a memory space of the NVM 400. For example, when a cumulative size of first data segments D1 to D8 among the data stored in the buffer 340 reaches the second size S2 (S630=YES), the cumulative set of first data segments D1 to D8 corresponding to the second size S2 may be programmed in a memory space of the NVM 400 as the second data segment DATA2 (S640).

On the other hand, so long as the cumulative size of received first data segments remains less than the second size (S630=NO), procedures S610 to S630 may be repeated until the cumulative size of received first data segments reaches the second size S2.

In certain computing systems consistent with embodiments of the inventive concept, it may be desirable to provide a legacy functionality, wherein a conventionally provided device driver in the host is capable of executing a block I/O operation. This block I/O operation may be executed when a data block of program data is at least as large as the second size described above. Hence in certain methods of operating a computing system including a host and a storage device like the ones illustrated above, the method may generate program data in the host to be programmed to the NVM. If the program data has a size at least equal to a second size, the data block I/O (or output) operation may be executed using a device driver provided by the host to transmit a data block of the program data to the storage device. Thereafter, programming the data block may be performed in the NVM. However, if the program data has a size less than the second size, one of the foregoing embodiments may be used to sequentially transmit first data segments from the host to the storage device, wherein each first data segment has a first size less than the second size. Thereafter, the first data segments may be sequentially and temporarily stored in the buffer until a cumulative size of the stored first data segments equals or exceeds the second size.

A computing system according to an embodiment of the inventive concept reduces the number of instructions required to program (or write) data in a non-volatile memory connected to a host, thereby reducing the number of instructions that must be processed by the host. In addition, such a computing system reduces the number of programming events for the non-volatile memory, thereby increasing useful life of memory cells in the non-volatile memory. Moreover, such a computing system need only transmit data required to be changed to the non-volatile memory, thereby increasing efficiency of a host interface.

Although a few embodiments of the present general inventive concept have been shown and described, it will be appreciated by those skilled in the art that changes may be made in these embodiments without departing from scope of the inventive concept as defined by the appended claims and their equivalents.

What is claimed is:

1. A method of operating a memory controller in a storage device including a non-volatile memory (NVM), wherein the memory controller comprises a memory processor a buffer, and a buffer control circuit, the method comprising:
   using the memory processor to receive a block of data from a host, store the block of data in the buffer, and thereafter program the block of data in the NVM if the received block of data has a size at least as equal to a second size; and
   using the memory processor to:
      sequentially receive first data segments from the host, wherein each first date segment has a first size;
      sequentially store the received first data segments in the buffer until a cumulative size of the received first data segments reaches the second size; and then, program the sequentially stored first data segments in the NVM,
   wherein the first size corresponds to a unit size for data processed by the host and the second size is an integer multiple of the first size and corresponds to a unit size of data programmed in the NVM,
   the buffer control circuit determines the cumulative size of the received first data segments and generates storage information corresponding to the received first data segments, and provides the storage information to the memory processor, and
   the memory processor generate a buffer indication signal in response to the storage information that causes the first data segments sequentially stored in the buffer to be programmed in the NVM when the cumulative size of the received first data segments reaches the second size.

2. The method of claim 1, wherein data stored in the buffer is arranged according to a buffer address data structure (buffer address) including a plurality of buffer address elements and a non-volatile memory address data structure (NVM address) including a plurality of NVM address elements,
   the received first data segments are respectively stored in a buffer address element selected from among the plurality of buffer address elements, and
   each buffer address element comprises a plurality of sub-buffer addresses respectively used to store one of the received first data segments.

3. The method of claim 2, further comprising:
   generating a buffer-to-NVM address mapping table in the host, wherein the buffer-to-NVM address table maps each one of the buffer address elements to a corresponding one of the NVM address elements.

4. The method of claim 3, further comprising:
   receiving the buffer-to-NVM mapping table in the storage device from the host during a storage device initialization procedure.

5. The method of claim 1, wherein during an initialization of the storage device the method further comprises:
   transmitting initialization information to the host, wherein the initialization information includes the buffer-to-NVM mapping table.

6. The method of claim 5, further comprising at least one of:
   updating a copy of the buffer-to-NVM mapping table stored in the storage device using the memory controller; and
   initialing an updating of a copy the buffer-to-NVM mapping table stored in the host using the memory controller, changed one-to-one mapping information to the host.

7. The method of claim 6, wherein the non-volatile memory includes three-dimensional memory cells.

8. A method of operating a computing system including a host and a storage device including a memory controller including a buffer, and a non-volatile memory (NVM), the method comprising:
   generating program data in the host to be programmed to the NVM;
   if the program data has a size at least equal to a second size, performing a data block output operation using a device driver provided by the host to transmit a data block of the program data to the storage device, and thereafter programming the data block in the NVM;
   if the program data has a size less than the second size, sequentially transmitting first data segments from the host to the storage device without use of the device driver, wherein each first data segment has a first size less than the second size,
   sequentially and temporarily storing the first data segments in the buffer until a cumulative size of the stored first data segments equals or exceeds the second size, and
   programming a second data segment having the second size and including the sequentially and temporarily stored the first data segments,
   wherein the first size corresponds to a processing unit for data received by the storage device from the host or data temporarily stored by the host before transmitting of the first data segments to the storage device, and the second size is a processing unit for data programmed in the non-volatile memory.

9. The method of claim 8, wherein data stored in the buffer is arranged according to a buffer address data structure (buffer address) including a plurality of buffer address elements and a non-volatile memory address data structure (NVM address) including a plurality of NVM address elements, the received first data segments are stored in a buffer address element selected from among the plurality of buffer address elements, and each buffer address element comprises a plurality of sub-buffer addresses respectively used to store one of the received first data segments.

10. The method of claim 9, further comprising:

generating a buffer-to-NVM address mapping table in the host, wherein the buffer-to-NVM address table maps each one of the buffer address elements to a corresponding one of the NVM address elements, wherein the buffer-to-NVM mapping table is received from the host during a storage device initialization procedure.

11. A method of operating a computing system including a host and a storage device, wherein the storage device includes a memory controller, a buffer and a non-volatile memory (NVM), the method comprising:

generating program data in the host;

if the size of the program data is equal to the second size, transmitting the program data from the host to the storage device as a block of data, storing the block of data in the buffer, and then programming the block of data in the NVM under the control of the memory controller; and if the size of the program data is less than the second size, sequentially transmitting the program data from the host to the storage device as a sequence of first data segments wherein each first data segment has a first size, and storing the first data segments in the buffer until a cumulative size of the stored first data segments equals or exceeds the second size and then programming the stored first data segments in the NVM under the control of the memory controller, wherein the first size corresponds to a unit size for processing data in the host, and the second size corresponds to a unit size for programming date in the NVM.

12. The method of claim 11, wherein the memory controller comprises a memory controller and a buffer control circuit, the method further comprising:

generating storage information (SI) in the buffer control circuit indicating the cumulative size of the first data segments;

generating a buffer indication signal (BIS) in the memory processor in response to the SI, wherein the stored first data segments are programmed in the NVM in response to the BIS when the cumulative size of the stored first data segments at least equals the second size.

13. The method of claim 11, wherein the sequence of first data segment is stored in the buffer in accordance with a buffer address data structure (buffer address) including a plurality of buffer address elements and a non-volatile memory address data structure (NVM address) including a plurality of NVM address elements, such that each one of the first data segments is respectively stored in a buffer address element selected from among the plurality of buffer address elements, and each buffer address element comprises a plurality of sub-buffer addresses respectively used to store one of the received first data segments.

14. The method of claim 13, further comprising:

generating a buffer-to-NVM address mapping table in one of the host and the storage device, wherein the buffer-to-NVM address table maps each one of the buffer address elements to a corresponding one of the NVM address elements.

15. The method of claim 14, further comprising:

generating the buffer-to-NVM address mapping table in the host; and transmitting the buffer-to-NVM address mapping table from the host to the storage device during a storage device initialization procedure.

* * * * *